United States Patent
Walz (10) Patent No.: US 6,939,075 B2
(45) Date of Patent: Sep. 6, 2005

(54) FITTING

(75) Inventor: Rüdiger Walz, Haigerloch (DE)

(73) Assignee: Häfele GmbH & Co. KG, Nagold (DE)

( * ) Notice: Subject to any disclaimer, the term of this patent is extended or adjusted under 35 U.S.C. 154(b) by 0 days.

(21) Appl. No.: 10/778,730

(22) Filed: Feb. 14, 2004

(65) Prior Publication Data

US 2004/0161294 A1 Aug. 19, 2004

(30) Foreign Application Priority Data

Feb. 19, 2003 (DE) .................................. 203 02 694 U (51) Int. Cl.⁷ .............................................. F16B 12/16
(52) U.S. Cl. ............................... 403/231; 403/DIG. 12; 403/403; 403/256
(58) Field of Search ........................ 403/DIG. 12, 231, 403/230, 403, 382, 257, 256, 294

(56) References Cited

U.S. PATENT DOCUMENTS 4,160,610 A * 7/1979 Austin-Brown et al. .... 403/231
4,930,931 A * 6/1990 Matsui ........................ 403/231
5,667,327 A * 9/1997 Salice ......................... 403/231
5,762,442 A * 6/1998 Salice ......................... 403/231

FOREIGN PATENT DOCUMENTS

| EP | 0359317 | 3/1990 |
| EP | 0898089 | 2/1999 |
| EP | 0949424 | 10/1999 |

* cited by examiner

Primary Examiner—John R. Gottingham
(74) Attorney, Agent, or Firm—Friedrich Kueffner

(57) ABSTRACT

A fitting for releasably connecting two plates, particularly furniture plates includes a clamping member which is rotatably mounted in a housing between a released position and a locked position, wherein the clamping member receives the head of a corresponding tightening bolt. The housing is composed of an upper part and a lower part which can be lockably connected with each other, wherein the two parts and the clamping member arranged between the two parts are manufactured in a single work step so as to be connected through intended breaking points.

6 Claims, 13 Drawing Sheets

FITTING

BACKGROUND OF THE INVENTION

The present invention relates to a fitting for releasably connecting two plates, particularly furniture plates. The fitting includes a clamping member which is rotatably mounted in a housing between a released position and a locked position, wherein the clamping member receives the head of a corresponding tightening bolt.

SUMMARY OF THE INVENTION

It is the object of the present invention to simplify the manufacture of the parts of the fitting and the assembly thereof.

In accordance with the present invention, the housing is composed of an upper part and a lower part which can be lockably connected with each other, wherein the two parts and the clamping member arranged between the two parts are manufactured in a single work step so as to be connected through intended breaking points.

As a result of the configuration according to the present invention, only a single tool is required if, for example, the fitting is manufactured by an injection molding process.

In order to be able to easily assemble the parts after the manufacture thereof, the clamping member is located prior to the assembly above the lower part of the housing and the upper part of the housing is located above the clamping member, wherein all three parts are arranged concentrically relative to each other. As a result, it is only necessary to press the upper part of the housing against the lower part. This causes the clamping member to be pressed through the upper part of the housing and with the upper part of the housing into the lower part, and the locking connection between the two housing parts takes place subsequently.

A further improvement is achieved if additionally the tightening bolt is manufactured in a single work step with the other parts and is also connected through an intended breaking point. In that case, the head of the tightening bolt is severed prior to effecting the locking connection of the housing parts and the head is placed into the clamping member, such that the free end of the tightening bolt, which is constructed as a shaft, protrudes out of the clamping member.

In accordance with a preferred embodiment, a sleeve for guiding the tightening bolt is arranged at the housing. The tightening bolt itself is provided at the end of its shaft opposite the head thereof with pivotable barb-type hooks which spread apart and interact with inclined contact surfaces provided at a free end of the sleeve or with a truncated cone-shaped sleeve end. The fully assembled fitting is then inserted with the shaft of the tightening bolt into the bore of one of the plates and the housing is inserted into the bore of the other of the plates. When the clamping member is then turned for tightening the tightening bolt, the pivotable barb-type hooks come into contact with the free end of the sleeve, the hooks are spread apart in the bore of the corresponding plate and are secured in the plate as a result.

In order to be able to once again easily separate the plates from each other, in a fitting with a tightening bolt whose shaft has a diameter which is offset relative to the diameter of the head, the fitting has one or more tightening cams which are approximately located opposite each other with the head part of the tightening bolt directed toward the shaft pressed against the tightening cam. The free head end, on the other hand, is located at an ejection cam. When the clamping member is turned against the tightening direction, the ejection cam causes a return displacement of the shaft of the tightening bolt directed into the bore. Simultaneously, the bore vaults pivot the bar-type hooks back into their original position in which they rest against the shaft, so that the fitting can then be taken out of the bore together with the tightening bolt.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
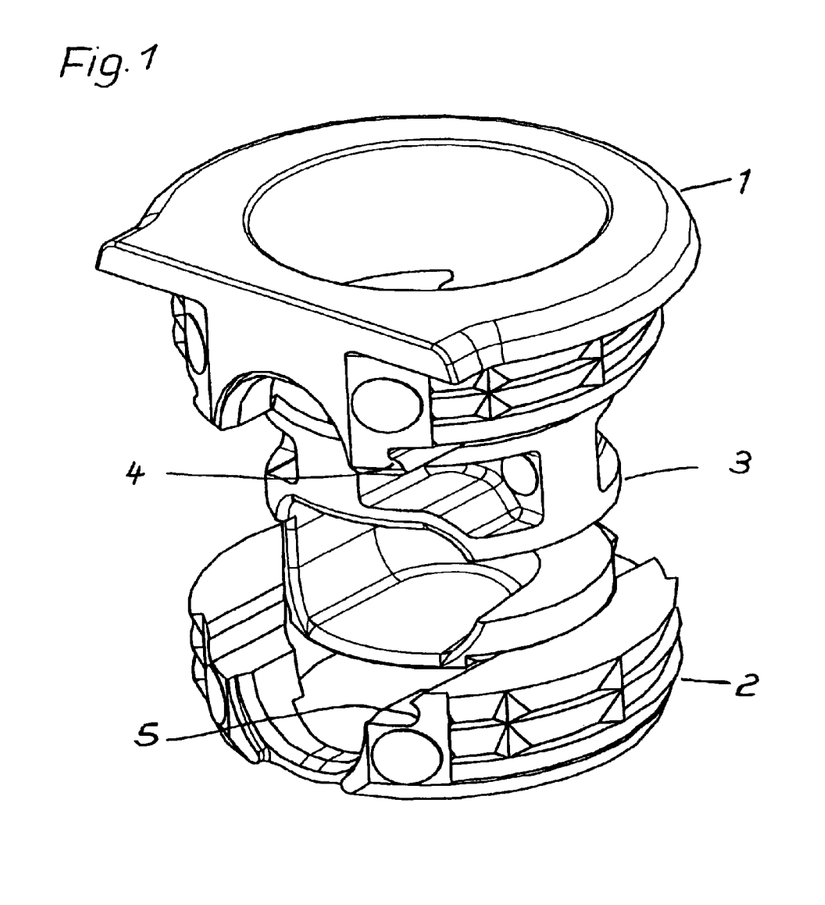
FIG. 1 is a perspective view of a three-part fitting prior to assembly.
Figure 2:
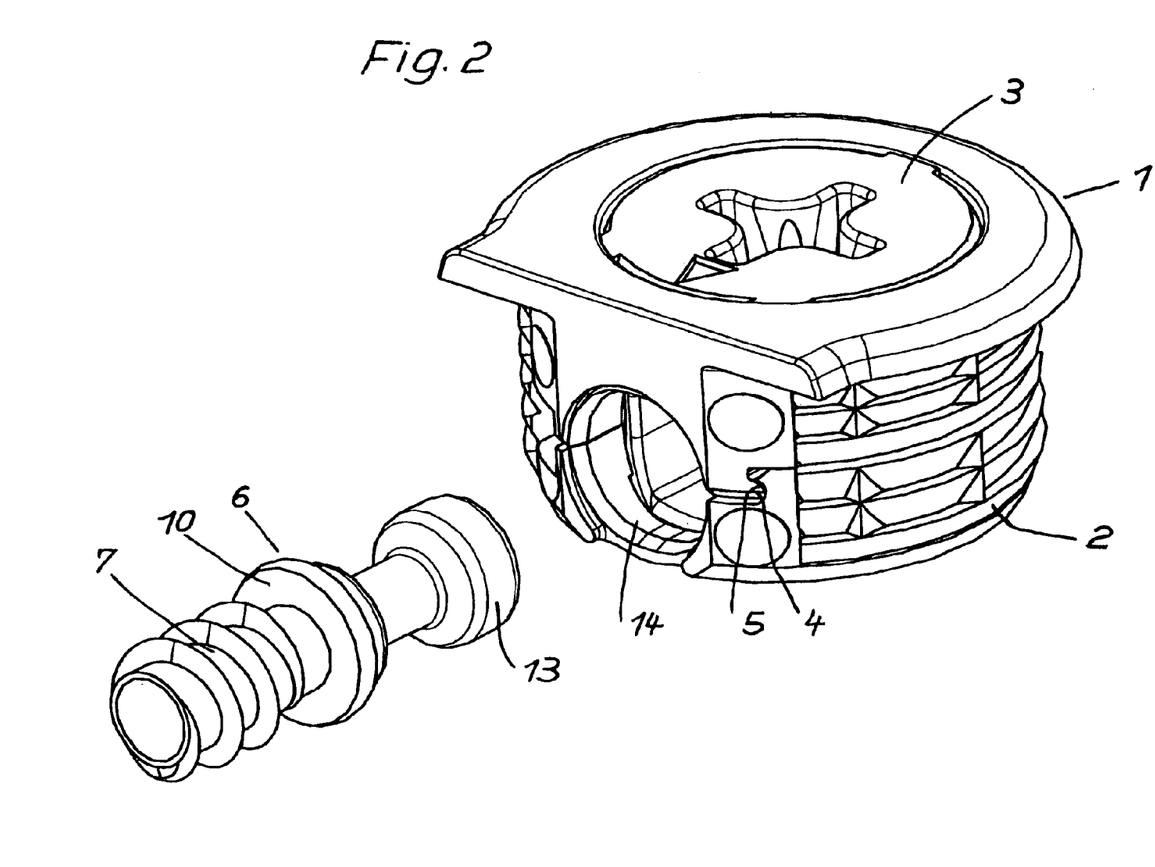
FIG. 2 is a perspective view of the fitting of FIG. 1 in the locked state of the fitting, with a tightening bolt placed in front of the fitting.

The fitting illustrated in FIG. 1 is composed of an upper part 1, a lower part 2 and a clamping member 3. These three parts are arranged concentrically one on top of the other and are connected to each other through intended breaking points, not illustrated. As soon as a pressure is exerted against the upper part 1 of the housing, the clamping member 3 is pushed into the lower part 2 of the housing and the upper part 1 of the housing is pushed onto the lower part 2 of the housing, until the projections 4 of the upper part 1 engage in the recesses 5 of the lower part 2, as illustrated in FIG. 2

Figure 3:
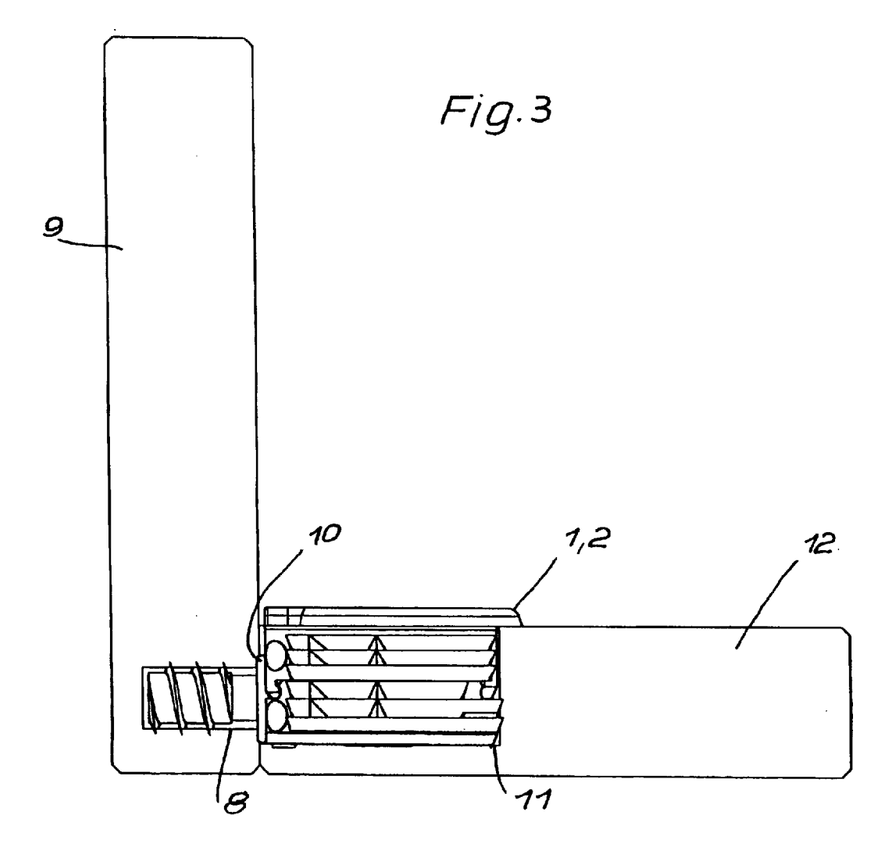
FIG. 3 is a cross-sectional view of two plates connected by the fitting of FIG. 1 and 2.

As shown in FIG. 3, the tightening bolt 6 is screwed with its shaft 7 into the bore of a plate 9 until the tightening bolt 6 makes contact with the annular flange 10. The housing 1, 2 is then placed into the bore 11 of the second plate 12 and the two plates 9 and 12 are then pressed together. Subsequently, the head 13 of the tightening bolt 6 is inserted through the opening 14 of the housing 1, 2 into the clamping member 3, so that, by turning the clamping part 3, the tightening bolt 6 is tightened and, consequently, the plates 9 and 12 are tightly connected to each other.

Figure 4:
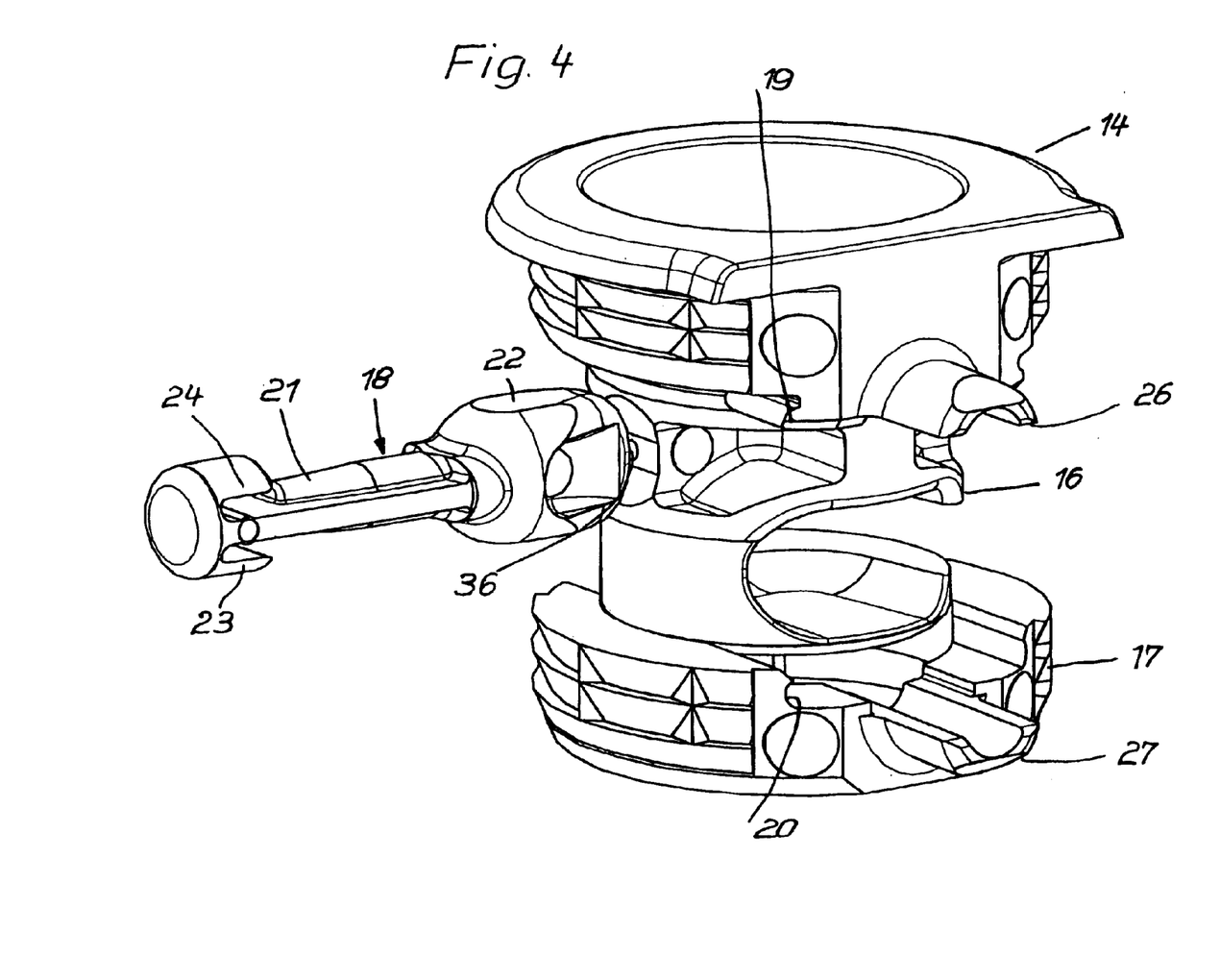
FIG. 4 is a perspective view of another embodiment of the fitting.
Figure 5:
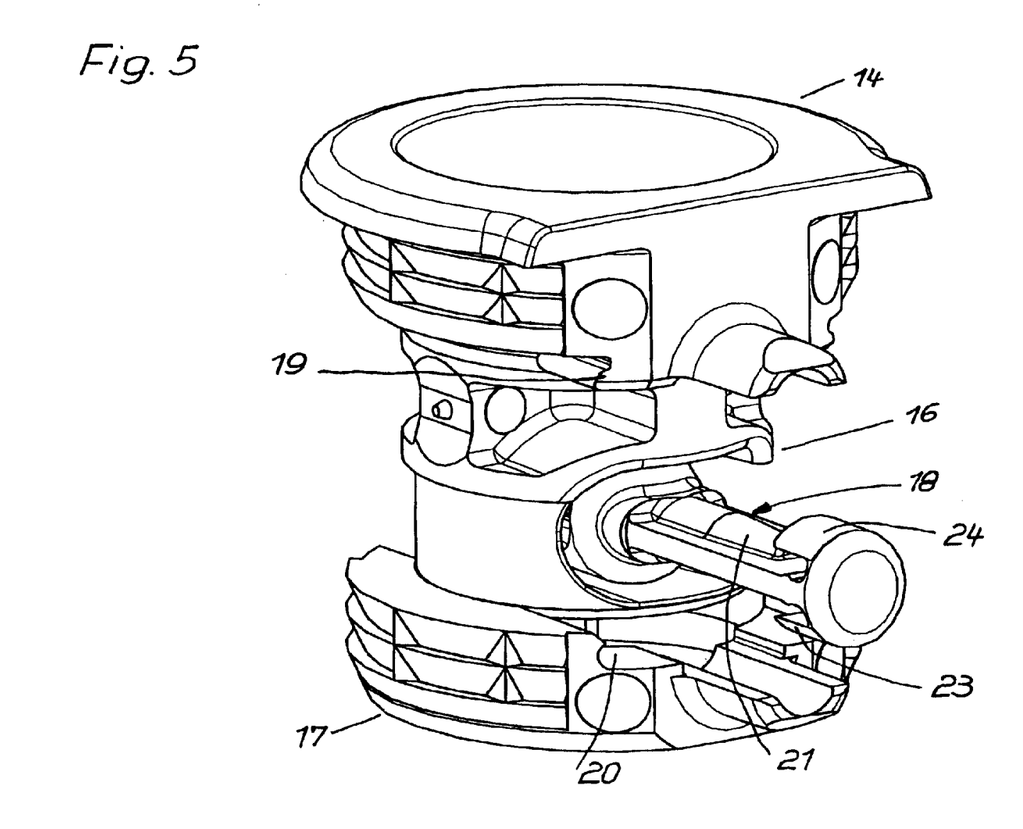
FIG. 5 is a perspective view of the fitting of FIG. 4 shown with a tightening bolt inserted into the clamping member.

FIG. 4 shows another embodiment of the fitting according to the present invention. The upper part 14 of the housing, the clamping member 16 and the lower part 17 of the housing are arranged concentrically one above the other and are connected to one another through intended breaking points, not shown. In addition, a tightening bolt 18 is provided which is connected through an intended breaking point 36 to the clamping part 16. As illustrated in FIG. 5, for assembling the parts, the tightening bolt 18 is separated from the clamping part 16 and is inserted into the clamping part 16. Subsequently, the upper part 14 and the lower part 17 of the housing are again pressed together until the fitting 15 according to FIG. 6 which is ready for use is obtained. Also in this embodiment, the parts are locked together by projections 19 and recesses 20.

Figure 6:
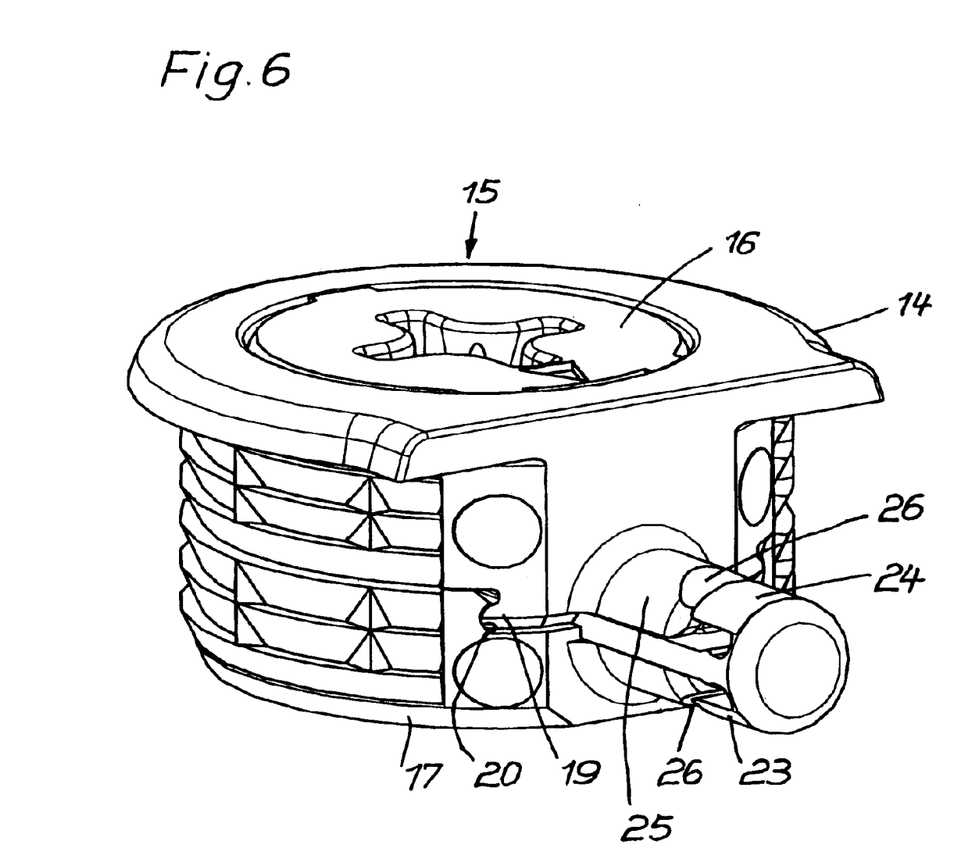
FIG. 6 is a perspective view of the fitting of FIG. 4 with the housing parts being locked together.

The tightening bolt 18 has a shaft 21 and a head 22. Provided at the free end of the tightening bolt 18 are two pivotable barb-type hooks 23, 24. The housing 14, 17 is provided with a sleeve 25 which at the free end thereof has two oppositely located inclined contact surfaces 26 for the hooks 23, 24.

Figure 7:
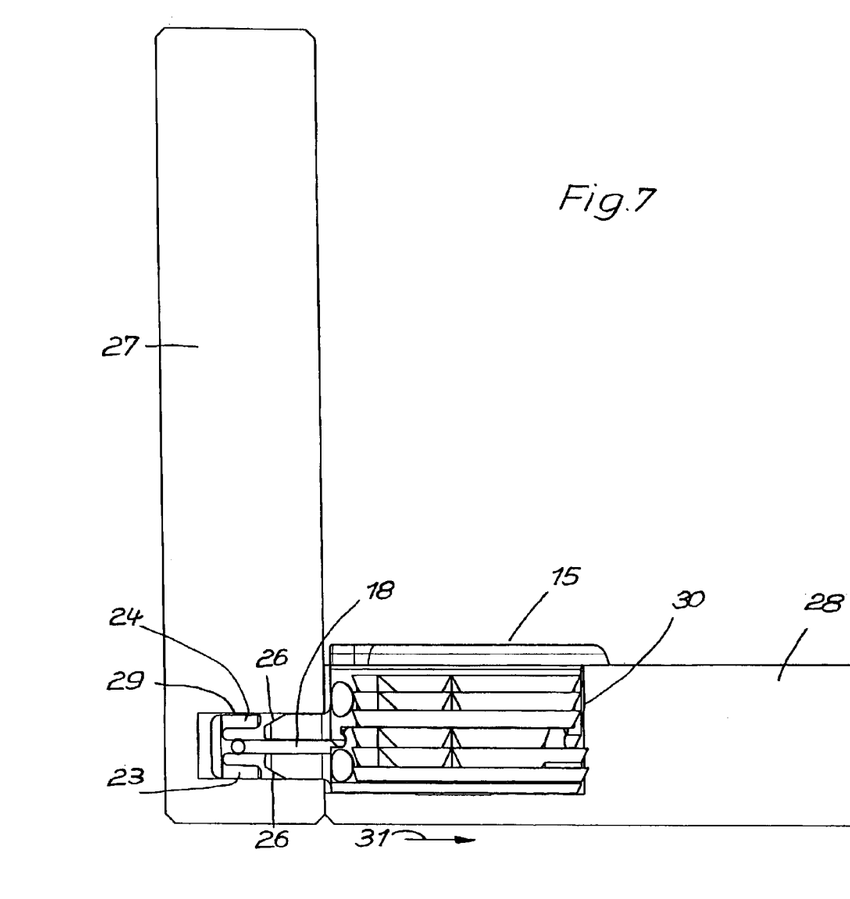
FIG. 7 shows the connection between two plates using the fitting of FIG. 6 with the tightening bolt not being tightened.
Figure 8:
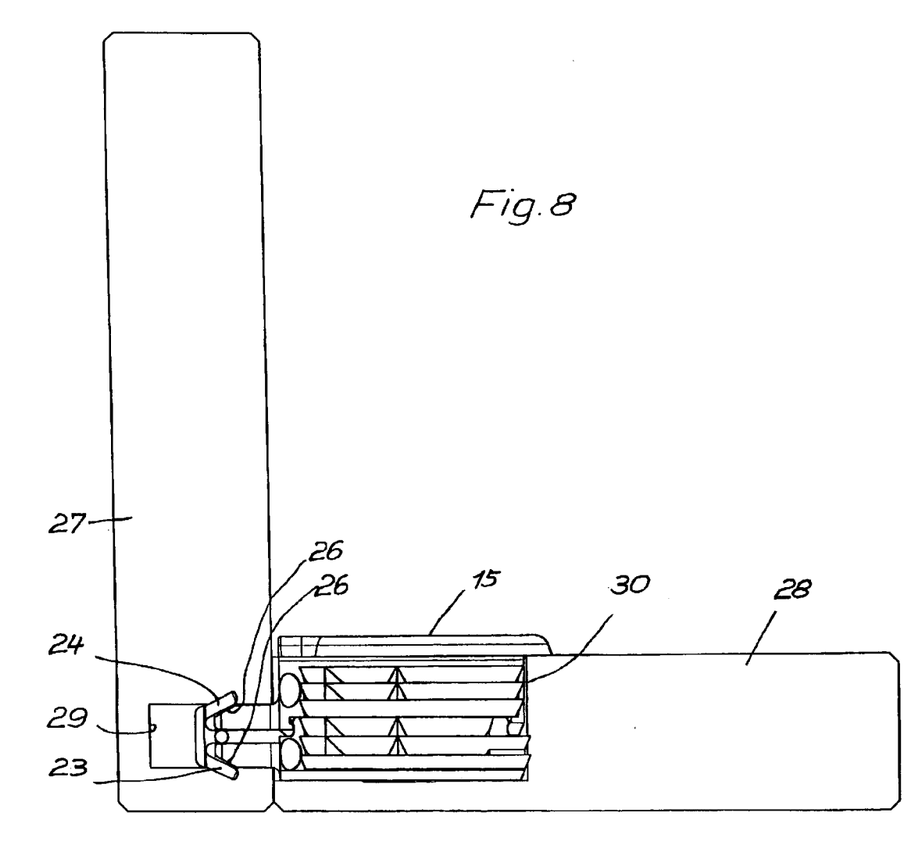
FIG. 8 shows the connection between two plates using the fitting of FIG. 6 with the tightening bolt being tightened.
Figure 9:
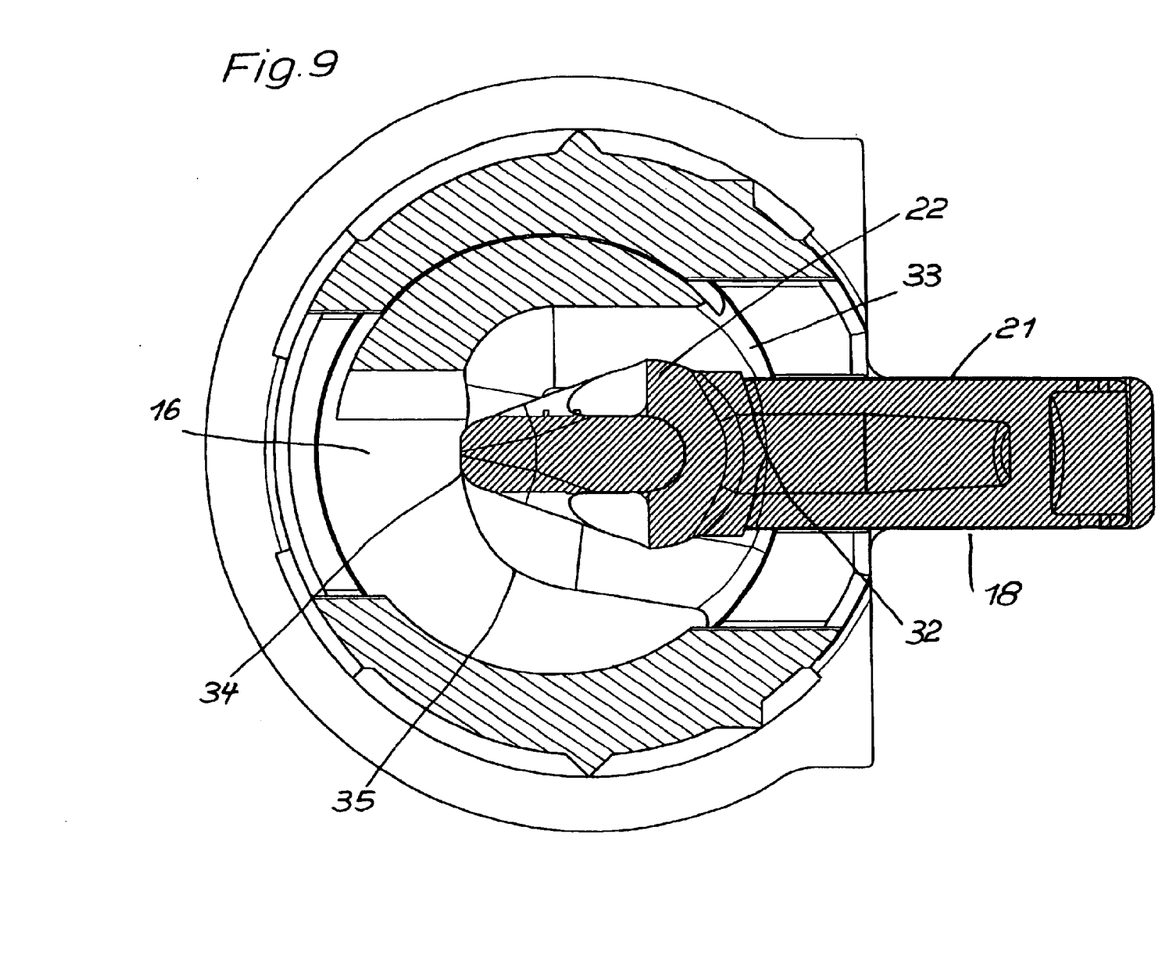
FIG. 9 is a cross-sectional view of the fitting of FIG. 6 shown with the clamping member in the initial position thereof.
Figure 10:
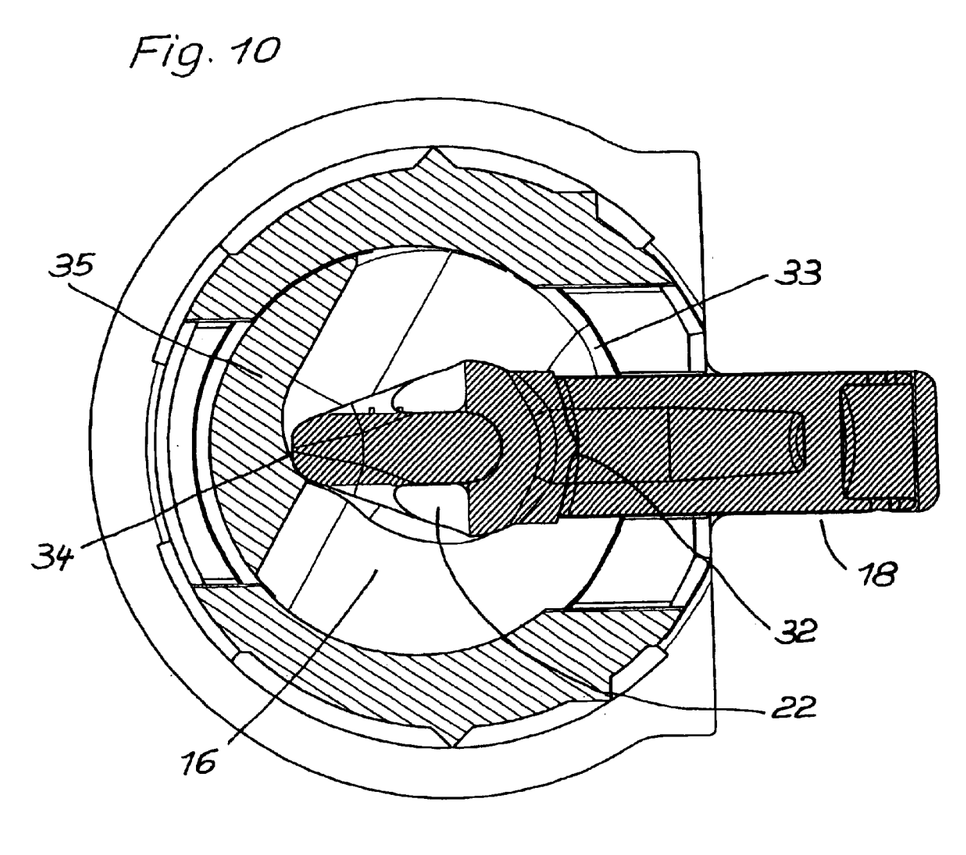
FIGS. 10 to 13 are cross-sectional views corresponding to FIG. 9, shown with the clamping member being in a 60° position, in a 90° position, in a 120° position and a 180° position, respectively.
Figure 11:
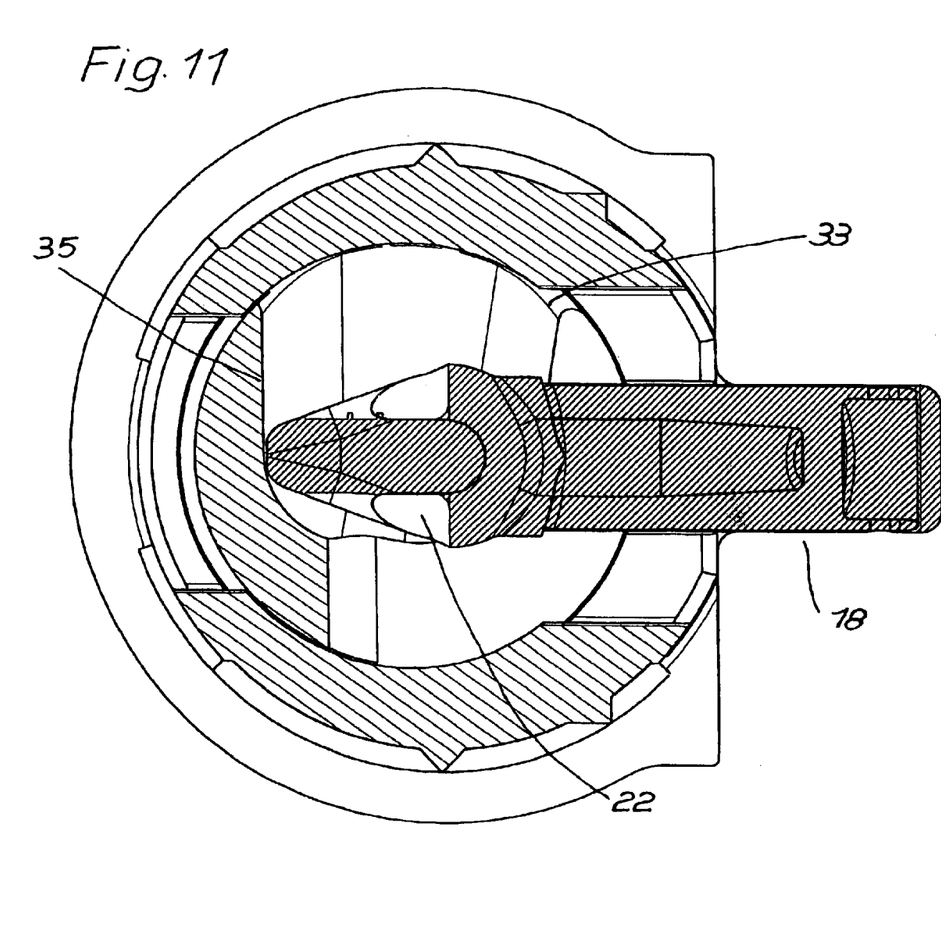
Figure 12:
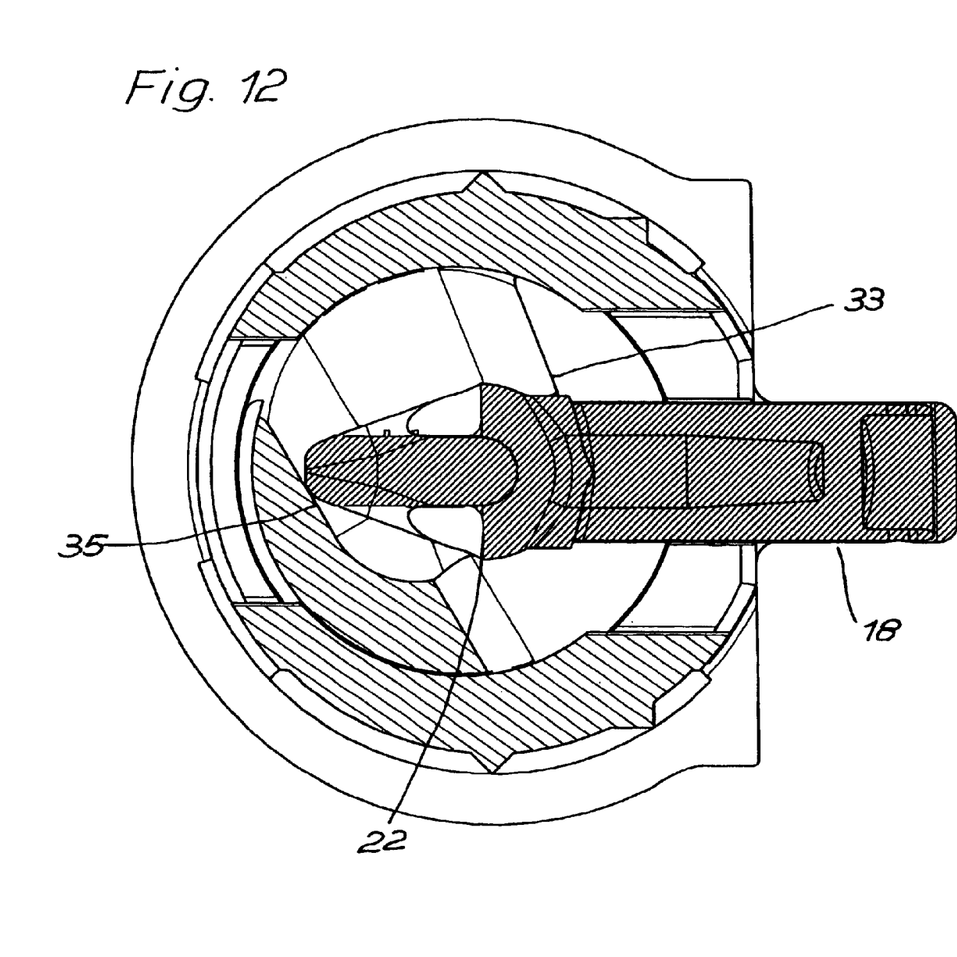
Figure 13:
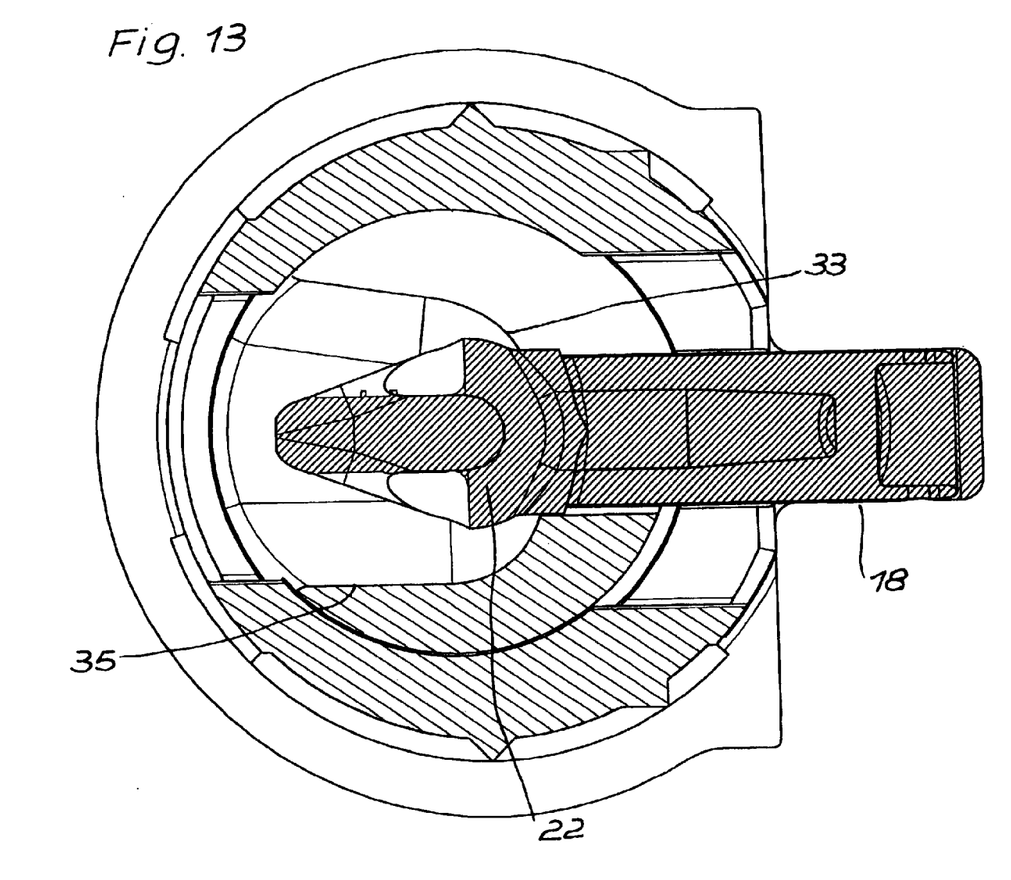

FIGS. 7 and 8 illustrate the interaction of the hooks 23, 24 with the inclined contact surfaces 26. The plate 27 has a bore 29 for the tightening bolt 18 and the plate 28 has a recess 30 for the housing 15. For connecting the two plates 27 and 28, initially the housing 15 is inserted into the recess 30 and subsequently the tightening bolt 18 is inserted into the bore 29. By turning the clamping member 16, the tightening bolt 18 is moved in the direction of arrow 31, so that the hooks 23 and 24 travel onto the inclined contact surfaces 26 and, as illustrated in FIG. 8, are spread apart and engage in the material of the plate 27, so that an absolutely tight seat of the tightening bolt 18 in the plate 27 is achieved and, thus, also a good connection between the two plates 27, 28.

FIGS. 9 through 13 show five positions of the clamping member 16 and of the tightening bolt 18 between 0° and 180°. The head part 32 directed toward the shaft 18 rests on the tightening cam 33, while the free head end 34 rests against the ejection cam 35. When the tightening bolt 18 is tightened, the clamping member 16 rotates against the clockwise direction and pulls the tightening bolt into the position illustrated in FIG. 13. When the clamping member 16 is turned in the clockwise direction, on the other hand, the clamping bolt is moved back into its initial position shown in FIG. 9 because its free head end 14 rests against the cam 35. Simultaneously, the hooks 23 and 24 slide off from the inclined contact surfaces 26 and, because of their contact with the walls of the bore 29, are once again returned into their initial position shown in FIG. 7, so that the plates 27 and 28 can then once again be separated from each other without problems.

While specific embodiments of the invention have been shown and described in detail to illustrate the inventive principles, it will be understood that the invention may be embodied otherwise without departing from such principles.

What is claimed is:

1. A fitting for releasably connecting two plates, the fitting comprising a housing comprised of an upper part and a lower part and a clamping member arranged between the upper part and the lower part, wherein the clamping member is rotatable in the housing between a released position and a locked position, wherein the clamping member is configured to receive a head of a tightening bolt, wherein the clamping member is located concentrically above the lower part of the housing and the upper part of the housing is located concentrically above the clamping member and the upper part, the lower part and the clamping member are manufactured in a work step so as to be connected to each other through intended breaking points and wherein, after the intended breaking points are severed, the upper part, the lower part and the clamping member are concentrically lockably connectable to each other.

2. The fitting according to claim 1, wherein the tightening bolt is additionally manufactured in a work step together with the housing and the clamping member so as to be connected through an intended breaking point.

3. The fitting according to claim 1, wherein, prior to the lockable connection of the upper and lower parts of the housing, the head of the tightening bolt is located in the clamping member, wherein a free end of the tightening bolt protrudes out of the clamping member.

4. The fitting according to claim 1, wherein the housing comprises a sleeve for guiding the tightening bolt.

5. The fitting according to claim 4, wherein the tightening bolt has at an end opposite the head pivotable hooks which interact with inclined contact surfaces provided at a free end of the sleeve or with a sleeve end constructed cone-shaped such that the hooks are spread apart.

6. The fitting according to claim 1, wherein the tightening bolt has a shaft with a diameter offset relative to a diameter of the head, wherein the clamping member has two approximately oppositely located tightening cams, wherein a head part directed toward the shaft of the tightening bolt rests against a tightening cam and a free head end of the tightening bolt rests against an ejection cam.

\* \* \* \* \*